Sept. 11, 1928.
C. BETHEL
1,684,341
ROTARY OILER
Filed July 24, 1925
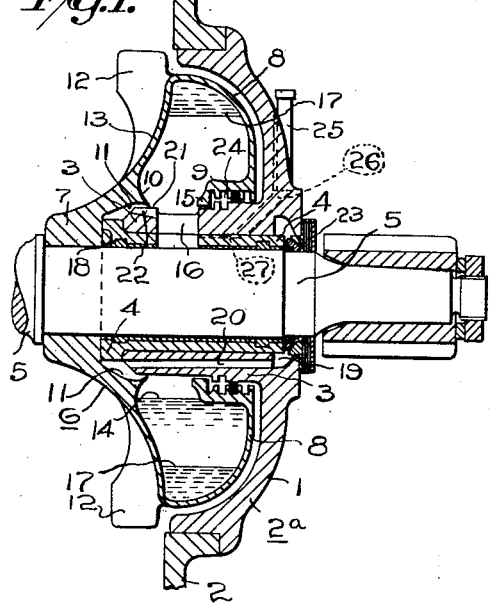
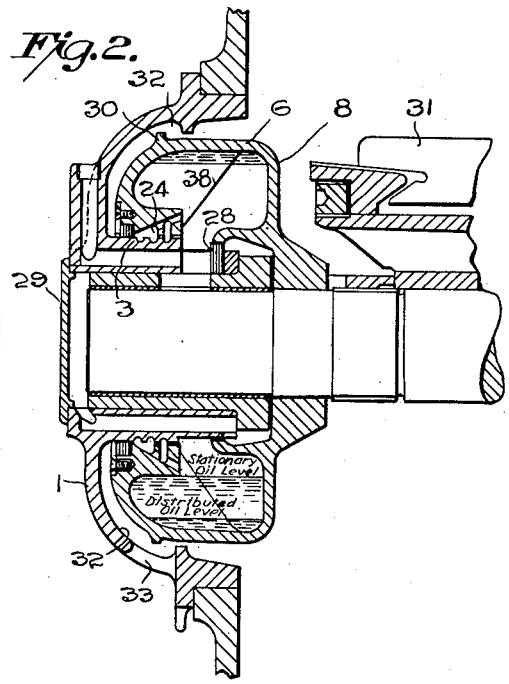
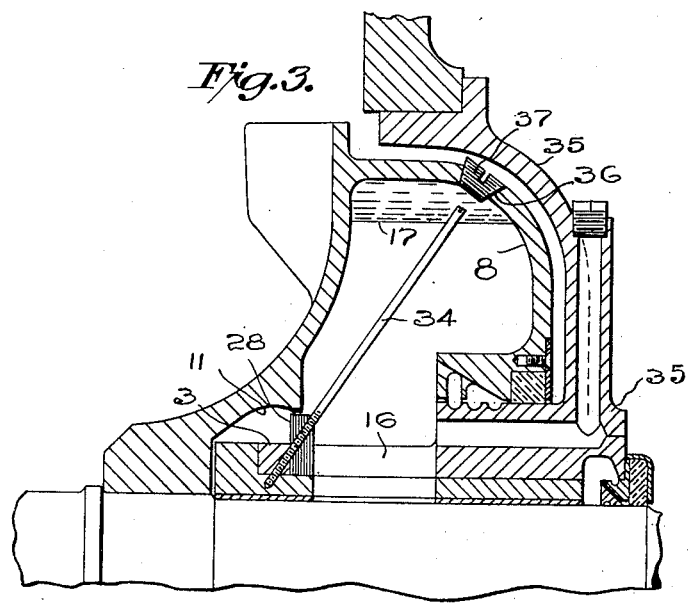
WITNESSES:
R. S. Harrison
O. B. Buchanan
INVENTOR
Claude Bethel
BY
Wesley G. Carr
ATTORNEY Patented Sept. 11, 1928.

1,684,341

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

ROTARY OILER.

Application filed July 24, 1925. Serial No. 45,748.

The present invention relates primarily to bearings and it has particular relation to bearings for use in dynamo-electric machines.

One of the objects of my invention is to provide a system of lubrication which will lubricate a journal bearing without the use of oil-conveying parts or material in contact with the journal.

A further object of my invention is to provide a motor bearing housing without an oil reservoir, without a receptacle for packing material, and without means for attaching an oil reservoir or a stationary lubricator.

A further object of my invention is to provide means for causing all, or a part of, the oil drained from a bearing to pass back into the bearing without first being returned to the main body of lubricating oil.

A still further object of my invention is to provide a combined fan, oil wiper and oil reservoir in a single integral element carried by the rotor member of a machine such as a dynamo-electric machine.

With the foregoing and other objects in view, my invention consists in the several novel elements and combinations hereinafter described and claimed and illustrated in the accompanying drawing, wherein Fig. 1 is a longitudinal sectional view of the pinion end of a railway motor, showing a bearing embodying my invention, Fig. 2 is a similar view of the commutator end of a railway motor having a slightly modified form of bearing embodying my invention, and Fig. 3 is a similar view of the pinion end of the motor shown in Fig. 2.

The lubricating system shown in Fig. 1 consists of a housing 1 mounted in a motor frame 2 and comprising a web portion 2a supporting one end of a laterally extending bearing sleeve 3 within which is disposed a journal bearing 4. Journaled in the journal bearing is a shaft 5 which carries my improved rotary oiler, designated, in its entirety, by the numeral 6.

The rotary oiler 6 comprises a hub member 7 which is secured to the shaft adjacent to the unattached end of the bearing sleeve 3 and journal bearing 4, said hub carrying an oil-storing chamber 8 terminating in a ledge 9 which surrounds the bearing sleeve 3 near its end which is attached to the web portion 2a of the bearing housing. The rotating oil-storing chamber 8 is provided with a deflector 10 projecting from the inner surface thereof into proximity with the outer surface of the housing sleeve 3 and providing a deflector pocket 11, for catching a small quantity of overflow oil, close to the end of the journal bearing adjacent to the hub 7, as will be explained more fully hereinafter.

An important aspect of my invention resides in the fact that I have obtained a remarkable economy in the utilization of space and materials, by reason of the fact that I mount the ventilating fan blades 12 of my motor directly upon the oil-storing chamber or reservoir 8 of my rotary oiler. The wall of the chamber 8, to which the fan blades are secured, is curved to provide a suitable air-guiding and fan-supporting web 13, which extends up from the hub member 7 and overhangs the bearing sleeve and journal bearing 3, 4. By reason of the construction just described, my oil reservoir 8 occupies the space normally wasted back of the fan-supporting web 13.

When the motor is at standstill, the oil in the rotary oiler is at the level 14, as shown in Fig. 1. As the armature begins to rotate, the oil is carried around by the rotary oiler, a small part of it running off a ledge 15 at the end of the flange 9 of the chamber 8, and a small part of it running off the deflector 10, a hole 16 being provided in the upper portion of the housing sleeve 3 and journal bearing 4, from which the oil drains into the usual bearing grooves (not shown). When the speed of the rotor becomes sufficiently high, the centrifugal forces cause the oil to be thrown to the outer portion of the oil storing chamber 8, as indicated by the oil level 17, Fig. 1.

In the form of my invention illustrated in Fig. 1, the oil stops draining from the main oil chamber into the bearing, when all of the oil has been thrown to the outer portion of the rotary oiler, as indicated by the oil level 17. The embodiment of my invention herein shown is intended for application to railway motors or other devices which are subject to frequent startings and stoppings, without long-sustained periods of continuous running.

In railway motors, as in other dynamo-electric machines, it is necessary to provide an oil wiper for wiping the oil from the end of the bearing, or from the shaft, in order to prevent its creepage into the windings or current-collecting devices of the machine. In the present case, the end surface 18 of the hub 7, adjacent to the journal bearing 4, performs the function of the wiper thrust surface usually provided in dynamo-electric machines of this type.

All of the oil which is fed into the bearing through the hole 16 passes out, either between the bearing and the wiper thrust surface 18 into the deflector chamber or pocket 11, or at the opposite end of the journal bearing 3 into an overflow pocket 19. The oil passing into the overflow pocket 19 is drained by a drain hole 20 which drains into the deflector chamber 11. In being thrown from the deflector chamber 11, a part of the oil is caught by a ledge 21 on the upper surface of the bearing sleeve 3, adjacent to the hole 16, whence it drains through a slot 22 into said hole 16. The ledge 21 fits closely to the deflector 10 so as to wipe the oil therefrom.

When the motor stops, the part of the oil at the outer periphery drains down the sides of the rotary oiler and off of the ledge 15 and the deflector 10 into the hole 16, the same manner as in starting. It is thus seen that a copious supply of oil is present, at starting, and a continuous supply of a smaller quantity of oil is circulated through the journal, while running, by reason of the collection of the overflow oil in the deflector pocket 11 and the return of the same directly to the bearing, from the ledge 21, without first being returned to the main body of lubricating oil in the outer portion of the oil-storing chamber 8.

Any suitable oil seal 23, or other means, is provided on the bearing housing web 2a to prevent loss of oil and entrance of dirt at the end of the journal bearing opposite to the hub 7. In like manner, an oil seal 24, or other equivalent means, is provided in the flange 9 of the rotary chamber 8 to prevent loss of oil and entrance of dirt between the free end of the chamber and the outer surface of the bearing sleeve 3 adjacent to the housing web 2a.

Oil may be supplied to the rotating oil reservoir by means of a filling pipe 25 and channels 26 and 27 in the bearing housing and journal bearing, communicating with the hole 16.

In Fig. 2, my invention is shown applied, in a slightly modified form, to the commutator end of a railway motor. The ledge 21 of Fig. 1, which scrapes some or all of the oil from the deflector 10, has been replaced, in Fig. 2, by a felt pad 28. As the commutator end of the motor is the end at which air is taken into the motor housing, the fan blades shown in Fig. 1 are omitted in the embodiment shown in Fig. 2. Furthermore, as the shaft does not project materially beyond the end of the bearing, the oil seal 23 of Fig. 1 is replaced, in Fig. 2, by means of a cap or closure 29 which seals the end of the bearing housing and performs the function of the means for preventing the escape of oil or the entrance of dirt at that end of the journal bearing.

A further slight modification is provided in the details relative to the oil-throwing projection 30, on the outer surface of the rotary oiler 6 in Fig. 2, which is for the purpose of absolutely preventing the possibility of oil reaching the commutator 31, in case of leakage at the oil seal 24 between the rotary oiler 6 and the bearing sleeve 3. Oil thrown from the flange 30 is collected in a pocket 32, in the bearing housing and is discharged therefrom through an opening 33 in the bottom thereof.

A further modification of my invention is shown in Fig. 3, wherein a stationary member is provided, in the shape of a rod 34 which is screwed into the bearing sleeve 3 adjacent to the opening 16. The rod 34 projects upwardly into the body of rotating oil which is indicated by the oil level designated by the numeral 17. As the rod 34 is carried by the stationary bearing housing, a continuous stream of oil flows down the same into the hole 16 and thence into the bearing. The oil which overflows from the ends of the bearing is caught in the deflector pocket 11, thence a part returns by way of the wiper 28 to the hole 16, and a part is thrown out into the main body of the lubricant in the outer portion of the oil-storing chamber.

For convenience in assembly, the end web 35 of the bearing housing, shown in Fig. 3, may be made detachable from the bearing sleeve 3. The rotating oil chamber 8 may also be provided with an opening 36 which is tapped and closed by a plug 37 through which access may be gained to the interior of the chamber for the purpose of inserting or removing the rod 34. In this manner, the bearing sleeve 3 may be inserted into the space within the rotary oiler, without the rod 34, after which said rod may be inserted through the hole 36, which is then closed by its plug 37, and the end web 35 may be put in place, thus completing the bearing housing comprising the parts 35 and 3.

It will be obvious that, in the modification shown in Fig. 3, my bearing is not limited to applications wherein there are frequent startings and stoppings of the motor, as a continuous supply of oil is obtained by means of the rod 34. However, it is believed that the method of supplying oil to the bearing from the oil reservoir 8, as shown in Figs. 1 and 2, is amply sufficient for the street-railway service for which my invention is primarily designed.

In any of the forms of my invention, the rotating oil chamber 8 may be provided with webs 38 (see Fig. 2), for the purpose of positively carrying the oil around with the oil chamber when the rotor is first turned through a small portion of a revolution.

I claim as my invention:

1. A self-contained oil-reservoir and bearing comprising a bearing housing having a stationary supporting web and a laterally extending bearing sleeve supported, at one end, by said web, a rotating shaft journalled in said bearing sleeve, a hub secured to said shaft at the free end of said sleeve, a rotating oil-storing chamber carried by said hub and overhanging said sleeve, a deflector projecting from the inner surface of said chamber into proximity with the outer surface of said housing sleeve and providing a deflector pocket for catching a small quantity of overflow oil close to the end of the journal bearing adjacent to said hub, and means for returning the overflow-oil from the other end of the bearing to said deflector pocket, said housing sleeve and journal bearing being provided with a hole in the upper portion thereof between said deflector and the unsupported end of said oil-storing chamber.

2. A self-contained oil-reservoir and bearing housing having a stationary supporting web and a laterally extending bearing sleeve supported, at one end, by said web, a journal bearing carried by said sleeve, a rotating shaft journalled in said journal bearing, a hub secured to said shaft at the free end of said sleeve, a rotating oil-storing chamber carried by said hub and overhanging said sleeve, said housing sleeve and journal bearing being provided with a hole in the upper portion thereof for supplying oil to the journal from said chamber, and said housing web being provided with a filling channel communicating with said hole.

3. The combination with a stationary bearing, of a rotary oiler therefor comprising a rotating part having an oil-storing chamber, said chamber being sufficiently large to hold all of the oil, without overflowing, at standstill, said oil being thrown to the outer portion of said chamber by centrifugal force during rotation, means for supplying oil from said chamber to said bearing, and means for passing all or a part of the oil drained from said bearing back into said bearing without first being returned to the main body of lubricating oil in the outer portion of said chamber, said last-mentioned means comprising a deflector projecting from the inner surface of said chamber and providing a deflector pocket for catching a small quantity of overflow oil close to said bearing, and means for applying oil to the bearing from said deflector pocket.

4. A self-contained oil-reservoir and bearing comprising a bearing housing having a stationary supporting web and a laterally extending bearing sleeve supported, at one end, by said web, a rotating shaft journalled in said bearing sleeve, a hub secured to said shaft at the free end of said sleeve, a rotating oil-storing chamber carried by said hub and overhanging said sleeve, means for preventing loss of oil and entrance of dirt between the free end of said chamber and the outer surface of said sleeve, adjacent to said web, means for preventing loss of oil and entrance of dirt at the end of said journal bearing opposite to said hub, a deflector projecting from the inner surface of said chamber into proximity with the outer surface of said housing sleeve and providing a deflector pocket for catching a small quantity of overflow-oil close to the end of the journal bearing adjacent to said hub, and means for returning the overflow-oil from the other end of the bearing to said deflector pocket, said housing sleeve and journal bearing being provided with a hole in the upper portion thereof between said deflector and the unsupported end of said oil-storing chamber.

5. A self-contained oil-reservoir and bearing housing having a stationary supporting web and a laterally extending bearing sleeve supported, at one end, by said web, a journal bearing carried by said sleeve, a rotating shaft journaled in said journal bearing, a hub secured to said shaft at the free end of said sleeve, a rotating oil-storing chamber carried by said hub and overhanging said sleeve, means for preventing loss of oil and entrance of dirt between the free end of said chamber and the outer surface of said sleeve, adjacent to said web, and means for preventing loss of oil and entrance of dirt at the end of said journal bearing opposite to said hub, said housing sleeve and journal bearing being provided with a hole in the upper portion thereof for supplying oil to the journal from said chamber, and said housing web being provided with a filling channel communicating with said hole.

6. A self-contained oil-reservoir and bearing comprising a stationary bearing housing having a supporting web and a laterally extending bearing sleeve supported, at one end, by said web, a journal bearing rigidly carried by said sleeve, a rotating shaft journalled in said journal bearing, a hub secured to said shaft at the free end of said sleeve, a rotating oil-storing chamber carried by said hub and overhanging said sleeve, the oil in said chamber being thrown to the outer portion thereof by centrifugal force during rotation, and means for causing a blast of cooling air to pass by said chamber to cool the main body of oil in the outer portion thereof.

7. A combined ventilating fan, bearing and oil-storing chamber occupying slightly more space than any of said three elements and comprising, in combination, a rotating shaft, a stationary bearing therefor, a supporting hub secured to said shaft at one end of said bearing, a curved air-guiding and fan-supporting web carried by said hub and extending over said bearing, the outer end of said web extending over and back toward said shaft to provide a rotating oil-storing chamber, fan blades secured to said web on the side opposite said oil-storing chamber, said chamber being sufficiently large to hold all of the oil, without overflowing, at standstill, said oil being thrown to the outer portion of said chamber by centrifugal force during rotation, and means for applying oil to the bearing from said chamber.

8. The combination with a stationary bearing, of a rotary oiler therefor comprising a rotating part having an oil-storing chamber, said chamber being sufficiently large to hold all of the oil, without overflowing, at standstill, said oil being thrown to the outer portion of said chamber by centrifugal force during rotation, means for supplying oil from said chamber to said bearing, and means for passing all or a part of the oil drained from said bearing back into said bearing without first being returned to the main body of lubricating oil in the outer portion of said chamber.

In testimony whereof I have hereunto subscribed my name this 11th day of July, 1925.

CLAUDE BETHEL.